(No Model.)
J. B. ROOT.
PIPE CONNECTION.
No. 315,075. Patented Apr. 7, 1885.
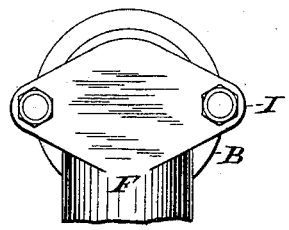
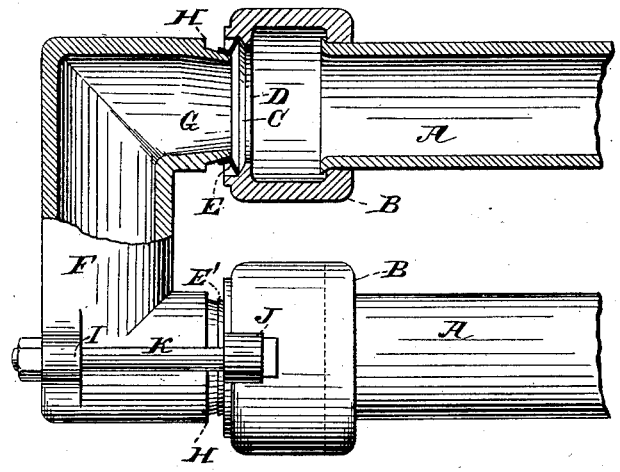
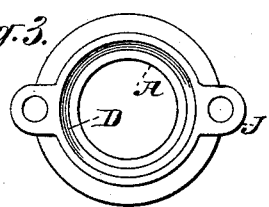
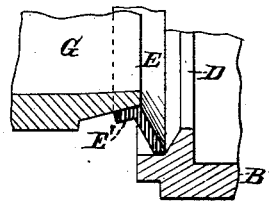
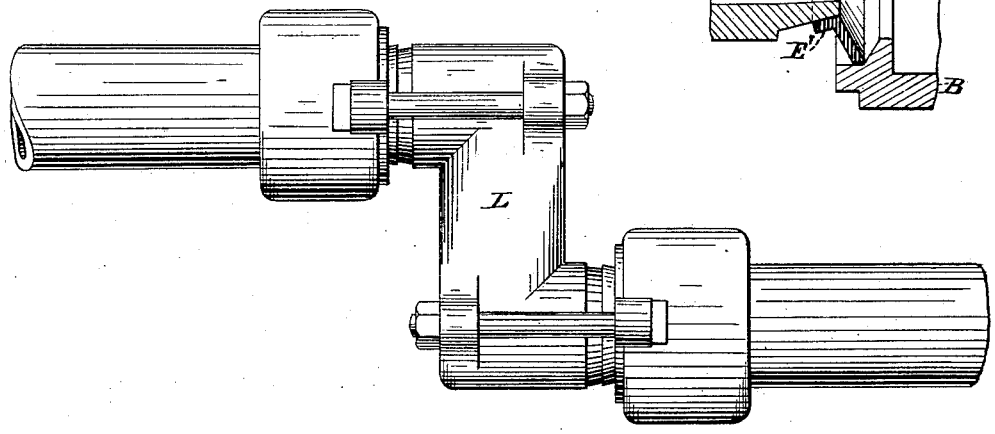
Witnesses:
Henry Eichling
R. F. Gaylord
Inventor
John B. Root

UNITED STATES PATENT OFFICE.

JOHN B. ROOT, OF PORT CHESTER, NEW YORK.

PIPE-CONNECTION.

SPECIFICATION forming part of Letters Patent No. 315,075, dated April 7, 1885.

Application filed May 12, 1884. (No model.)

*To all whom it may concern:*

Be it known that I, JOHN B. ROOT, of Port Chester, in the county of Westchester and State of New York, have invented certain new and useful Improvements in Pipe-Connections, of which the following is a specification, reference being had to the accompanying drawings.

My invention relates particularly to flexible connections for uniting the ends of parallel pipes, or pipes running angularly; and it consists of lateral connections or bends provided with means for fastening their respective ends to the ends of the pipes to be united, and of flexible annular connecting-rings, which are arranged between the ends of the bends and the ends of the pipes, so as to make an improved expansible joint. The special purpose of this connection is to permit the expansion and contraction of the pipes without effecting the opening of any joints.

Figure 1 of the drawings shows two pipes united by a connection embodying the invention, one pipe and its portion of the bend being in central longitudinal section. Fig. 2 is a view of one end of a bend, looking toward the end of a pipe. Fig. 3 is an end view of a pipe and its head. Fig. 4 is an enlarged detail view of the flexible ring and adjoining parts, and Fig. 5 shows a modification of the connection.

A A represent two pipe-sections.

B B are heads into which the ends of the pipe-sections are expanded or otherwise attached to the heads. The opposite sides of these heads have openings C, which are directly in front of the ends of the pipes, and are provided with shoulders D.

E are metallic annular disks or rings, constructed to fit closely in the openings C and upon the shoulders D. These rings are conical in shape and sufficiently thin to have the flexibility required for the purpose for which they are used.

F is a connecting-bend, the ends G of which are beveled and fit into the necks E' of the flexible rings. Shoulders H at the ends of the bend prevent these ends being forced too far into the rings by coming in contact with their necks.

I I are lugs upon each end of the bend, and J J are lugs upon the heads, by which the bends and heads are held together through the medium of bolts K.

When these parts are properly fastened together, the ends of the bends are screwed down with sufficient force to put the connecting-rings under tension, which causes their outside edges to be expanded into their seats and their inner edges or necks to be tightened upon the tapering ends of the bends, thus making very tight and secure joints. The flexibility of the connecting-rings permits the bends and the pipes, with their heads, to have all the movement relatively that is necessary to compensate for the varying effects of expansion and contraction without opening the joints between the parts; and it is to be noticed in this connection that the endwise movement of either or both of the two pipes united by a bend is compensated for by the lateral movement of the bend, and hence by the action of both of the connecting-rings, so that dividing the effects of expansion and contraction between the flexible connecting-rings of two or more joints enables me to use small rings and make compact joints.

This connection is applicable to all the various structures composed of series of connected pipe-sections—such as heaters, condensers, sectional boilers, and the like. It may be modified in its adaptations to different structures, and in Fig. 5 I show a modified form, L being a bend in all substantial respects like that of Fig. 1, but constructed for connecting the adjacent sections of an extended line of pipe. Other modifications are manifest—such as seating the flexible rings in the bends or in the ends of the pipes, and using other means of connecting the ends of the pipes to the bends; but the forms shown will suffice to illustrate the principle and scope of the invention.

What is claimed as new is—

1. In a flexible pipe-connection, a flexible ring having its outer edge expanded into a seat in one of the connecting parts, and its inner edge tightened around the other connecting part, as and for the purpose set forth.

2. In combination, in a flexible pipe-connection, a flexible ring having its outer edge expanded into a seat in one of the connecting parts, and its inner edge tightened around the other connecting part, and fastenings for uniting the connecting parts, as and for the purpose set forth.

3. In a flexible pipe-connection, the combination of a bend, flexible rings arranged between the ends of the bend and the connecting-sections of pipe, and fastenings for uniting the respective ends of the bend to the ends of the pipes, substantially as and for the purpose set forth.

JOHN B. ROOT.

Witnesses:
R. F. GAYLORD,
T. J. KEANE.